United States Patent [19]
Foral

[11] Patent Number: 5,733,417
[45] Date of Patent: Mar. 31, 1998

[54] WATER AND ORGANIC CONSTITUENT SEPARATOR AND STRIPPER SYSTEM AND METHOD

[75] Inventor: Adolph J. Foral, Houston, Tex.

[73] Assignee: Gas Research Institute, Chicago, Ill.

[21] Appl. No.: 743,598

[22] Filed: Nov. 4, 1996

Related U.S. Application Data

[62] Division of Ser. No. 378,552, Jan. 25, 1995, Pat. No. 5,575,894.

[51] Int. Cl.⁶ ............................................. B01D 3/00
[52] U.S. Cl. .................. 203/18; 203/12; 202/160; 202/176; 202/182; 202/197
[58] Field of Search .................... 202/152, 153, 202/159, 160, 173, 176, 180, 182, 197; 203/12, 14, 18, 98, DIG. 14; 210/180, 181, 202, 774, 806

[56] References Cited

U.S. PATENT DOCUMENTS

| | | | |
|---|---|---|---|
| 3,616,598 | 11/1971 | Foral, Jr. | 55/32 |
| 3,648,434 | 3/1972 | Gravis, III et al. | 55/32 |
| 3,840,437 | 10/1974 | Awan et al. | 203/2 |
| 3,841,382 | 10/1974 | Gravis, III et al. | 159/16 R |
| 4,280,867 | 7/1981 | Hodgson | 159/47 |
| 4,314,891 | 2/1982 | Knobel | 203/18 |
| 4,322,265 | 3/1982 | Wood | 159/47 R |
| 4,332,643 | 6/1982 | Reid | 203/18 |
| 4,370,236 | 1/1983 | Ferguson | 210/634 |
| 4,375,387 | 3/1983 | deFilippi et al. | 202/169 |
| 4,689,053 | 8/1987 | Heath | 55/20 |
| 4,775,395 | 10/1988 | Rojey et al. | 55/27 |
| 4,913,771 | 4/1990 | McIntyre | 159/47 |
| 5,084,074 | 1/1992 | Beer et al. | 55/20 |
| 5,084,187 | 1/1992 | Wilensky | 210/768 |
| 5,141,536 | 8/1992 | Schievelbein et al. | 55/208 |
| 5,167,773 | 12/1992 | Eagan et al. | 202/158 |
| 5,167,838 | 12/1992 | Wilensky | 210/768 |
| 5,176,798 | 1/1993 | Rodden | 202/159 |
| 5,209,762 | 5/1993 | Lowell | 55/31 |
| 5,234,552 | 8/1993 | McGrew et al. | 203/18 |

*Primary Examiner*—Christopher Kim
*Attorney, Agent, or Firm*—Dick and Harris

[57] ABSTRACT

A regenerating system, for the removal of water and potentially harmful organic constituents from a dehydration fluid used to dehydrate gas. The system includes apparatus for converting all the organic constituents to a gaseous phase; and utilizing the gaseous organic constituents in the separation of the water from the dehydration fluid.

4 Claims, 3 Drawing Sheets

WATER AND ORGANIC CONSTITUENT SEPARATOR AND STRIPPER SYSTEM AND METHOD

This application is a division of application Ser. No. 08/378,552, filed Jan. 25, 1995, (U.S. Pat. No. 5,575,844).

BACKGROUND OF THE INVENTION

1. Field of the Invention

The present invention relates to an apparatus for separating moisture, and more particularly water from a glycol regenerator/still which has been removed from, for example, natural gas during dehydration of same.

2. The Prior Art

Natural gas, when it is drawn from underground sources, often is "contaminated" with water vapor. The presence of such water vapor is undesirable, since it can cause corrosion as well as facilitate hydrate formation in natural gas pipelines.

To remove such water vapor, dehydrators, such as glycol dehydrators have been used to remove the water vapor from the gas. Other forms of dehydrators, which do not absorb the water, or which utilize solutions other than glycol, have also been known in the art.

With respect to the use of glycol, and for example, triethylene glycol, such a solution acts as an absorbent with respect to water vapor. The moist glycol is then later distilled in what is known as a glycol regenerator. After the water is separated from the glycol solution, this "clean" glycol is then reused for further dehydration of natural gas.

Inasmuch as natural gas typically contains various volatile organic compounds (VOCs) such as benzene, toluene, ethylbenzene, and xylenes (collectively known as BTEX), as well as water, and inasmuch as such organics also become absorbed into the glycol during dehydration, these potentially harmful constituents likewise become separated from the glycol during the distillation process. However, because of the toxicity of the BTEX components and, in turn, the potential danger they may cause if released into the ambient environment, methods have been devised for removing such BTEX from the water during distillation from the glycol solution toward operable and safe use of same.

One such system for removing BTEX from recovered water is shown in Lowell, U.S. Pat. No. 5,209,762, the disclosure of which is incorporated herein by reference. In the Lowell '762 system, the water vapor is passed through a condenser having one or more stages which may be air and/or water cooled. The condensate is then collected in a three-phase separator, in which the condensate forms in three distinct layers: on bottom, purified liquid water; in the middle, liquid BTEX; on top, gaseous BTEX. The liquid water may then be passed to a series of one or more strippers, and other subsequent polishing stages, to further reduce the amount of BTEX and other undesirable organic constituent compounds. The liquid BTEX is drained off and recovered—inasmuch as BTEX, in liquid form, has viable commercial uses, such as for fuel. The gaseous BTEX is either emitted into the ambient environment, burned as a waste gas flare, or alternatively, is added to the fuel gas used to provide the heat for the glycol regenerator. Accordingly, when the gaseous BTEX compounds are combusted, they are broken down into environmentally more acceptable combustion byproducts.

It may be desirable to employ such glycol dehydration systems in both onshore and offshore applications. Particularly in offshore applications, it may not be efficient or possible to collect and store liquid BTEX. However, the amount of BTEX in the water removed from the gas must be lowered to acceptable levels, as determined by the appropriate regulatory agencies, even if the water is not going to be used, but is merely going to be released to drain, or, as in the case of an offshore installation, piped overboard.

Accordingly, it is desirable to provide a method for separating BTEX from water which has been distilled from gas, which method enables the recovered water to be safely released to ambient or otherwise discarded, and which disposes of the BTEX removed therefrom in a safe and expeditious manner.

SUMMARY OF THE INVENTION

The present invention is a system for separating water recovered during the dehydration of a gas, such as a natural gas, wherein the system includes a dehydrating solution used to initially absorb water from the gas.

The system comprises means for distilling water from the solution after dehydration of the gas; means for condensing the water from the distilling means, operably associated with the means for distilling water; means for initially separating the condensed water, from the condensing means, from substantially any organic constituents which may also have been drawn from the distilling means, operably associated with the condensing means; and means for utilizing at least a portion of the organic constituents, initially separated from the condensed water, for providing energy for distillation of the water by the means for distilling water, the means for utilizing the organic constituents being operably associated with the means for distilling water.

In a preferred embodiment, the means for distilling water further comprises a gas-fired heat source; and heat exchanger means, operably associated with the gas-fired heat source and operably configured so as to enable the dehydrating solution to be placed in heat receiving relationship relative to the heat exchanger means, such that the water and the organic constituents are converted to gaseous form and conveyed away from the dehydrating solution.

The means for utilizing at least a portion of the organic constituents further preferably comprises means for transporting gaseous components of the organic constituents separated from the water to the gas-fired heat source, for combustion therein.

The means for utilizing at least a portion of the organic constituents further comprises means for converting liquid components of the organic constituents to gaseous form; and means for transporting the formerly liquid components of the organic constituents to the gas-fired heat source for combustion therein.

The invention also includes means for filtering the water so as remove a predetermined amount of any remaining organic constituents in the water, so as to render the Water substantially fit to be discarded.

In a preferred embodiment, the present invention comprises means for heating the dehydrating solution, so as to drive the water from the dehydrating solution; the means for heating the solution including a gas-fired burner apparatus, a source of gaseous fuel, and means for delivering the gaseous fuel to the gas-fired burner apparatus, so as to provide for dehydration of the gas, the means for delivering the gaseous fuel to the gas-fired burner apparatus further including means for controlling the flow of the gaseous fuel to the burner apparatus, substantially independently of the pressure at which the gaseous fuel is supplied from the source of gaseous fuel; means for condensing the water from the distilling means, operably associated with the means for distilling water; and means for initially separating the condensed water, from the condensing means, from substantially any organic constituents which may also have been drawn from the distilling means, operably associated with the condensing means.

The means for controlling the flow of the gaseous fuel to the burner apparatus, substantially independently of the pressure at which the gaseous fuel is supplied from the source of gaseous fuel further comprises at least two conduit means, operably connected for parallel communication of gas from the source of gaseous fuel to the burner apparatus; valve means, operably disposed in at least one of the at least two conduit means; temperature sensor means, operably associated with the means for heating the hydrating solution, and control means, operably associated with the valve means and the temperature sensor means, so as to vary the flow of gaseous fuel to the burner apparatus as a preselected function of the temperatures sensed by the temperature sensor means.

At least one ejector means are operably disposed in at least one of the at least two conduit means, for receiving the gaseous fuel and expanding same, such that the pressure of the gaseous fuel is lower at a position in the at least one conduit means downstream of the at least one ejector means, relative to the pressure of the gaseous fuel at a position upstream of the at least one ejector means; and means for diverting, away from the burner apparatus, at least a portion of the gaseous fuel from at least one of the at least two conduit means, operably connected to the at least one of the at least two conduit means, at a position downstream from the at least one ejector means.

The invention also comprises a method for separating water, recovered during the dehydration of a gas, such as natural gas, from a dehydrating solution, the method comprising the steps of:

a) distilling the water from the dehydrating solution with distilling apparatus;

b) condensing the water from the distilling apparatus;

c) performing an initial separation of substantially any organic constituents which also may have been drawn from the dehydrating solution, from the water, into at least a liquid phase and a gaseous phase;

d) converting all of the organic constituents which have been separated into a gaseous phase;

e) combusting the gaseous organic constituents in the distilling apparatus.

In a preferred embodiment of the invention, the method also comprises the steps of filtering the water with filter apparatus, so as to remove a predetermined amount of any remaining organic constituents from the water, so as to enable the water to be fit to be discarded.

The step of converting all of the organic constituents into a gaseous phase may further comprise the step of conducting the liquid phase of the organic constituents through the distilling apparatus and evaporating same. In addition, the step of distilling the water includes the step of heating the water with a gas-fired burner apparatus being fueled by gas from a pressurized fuel source, and the step of combusting the organic constituents further comprises the step of mixing the organic constituents with the gas from the pressurized fuel source.

In a preferred embodiment, the method further comprises the steps of monitoring the temperature of the distilling apparatus; and varying the flow of fuel from the fuel source to the burner apparatus as a function of the temperature of the distilling apparatus which is being sensed.

Alternatively, the method may comprise the step of transporting the fuel from the fuel source to the burner apparatus via two or more conduit apparatus operably disposed in parallel relation to one another. The fuel is further expanded as it is being transported from the pressurized fuel, source to the burner apparatus.

BEST MODE FOR PRACTICING THE INVENTION

Figure 1:
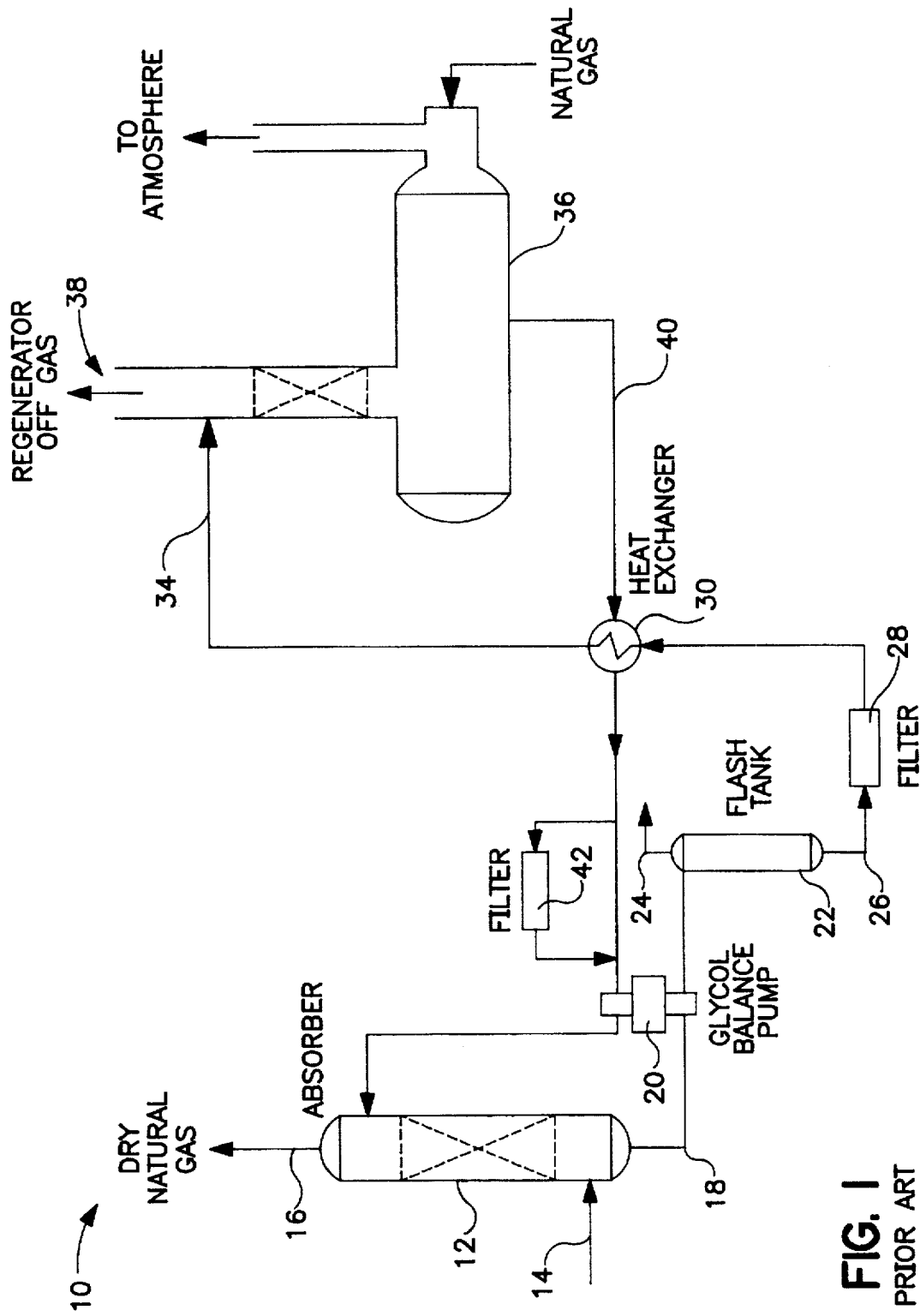
FIG. 1 is a schematic illustration of a prior art glycol dehydration apparatus.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

A prior art glycol dehydration system 10 is shown in FIG. 1. Moisture laden natural gas is inletted into absorber 12 at inlet 14. The gas contacts the regenerated glycol in absorber 12 in a known manner, and leaves absorber 12 as dry natural gas at outlet 16. Water and BTEX laden glycol leaves absorber 12 at outlet 18, passing through balance pump 20, to flash tank 22. Balance pump 20 is provided to regulate the flow of regenerated glycol going into absorber 12, as well as the flow of used glycol exiting absorber 12. In flash tank 22, the used glycol is expanded, with light gases, such as methane and propane, being vented at 24. The light gases simply may be burned off, or piped for use in the glycol regenerator 36. The remaining liquid glycol and water will exit flash tank 22 at 26, pass through a filter 28, and proceed to heat exchanger 30, where the liquid glycol and water will pick up heat from the regenerated glycol exiting regenerator 36.

The warmed liquid glycol and water are then conducted at 34 to regenerator 36, which may be fired by natural gas, which may be mixed with the light gases from the flash tank 22, as well as gaseous BTEX from the separator, where they are heated such that the water and BTEX are desorbed, at 38.

The regenerated glycol exits regenerator 36 at 40, and is conducted through heat exchanger 30. After giving off heat to the glycol and water mixture from absorber 12, the regenerated glycol may be circulated through a filter 42, pumped up to appropriate pressure at balance pump 20, and circulated through absorber 12, to complete the glycol circuit.

Figure 2:
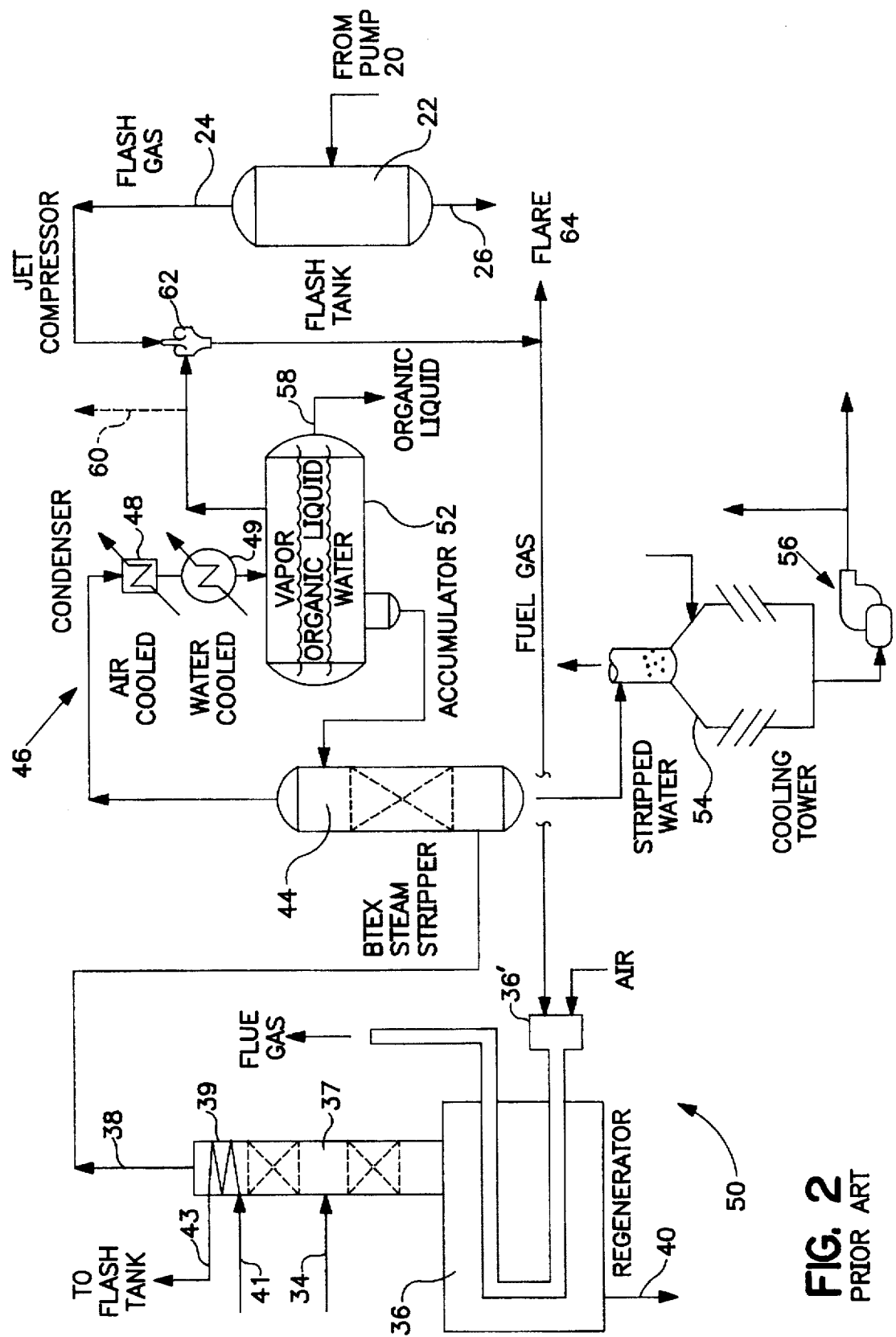
FIG. 2 is a schematic illustration of a prior art BTEX separation apparatus used with the prior art glycol dehydration apparatus of FIG. 1, and illustrating the glycol regenerator of the dehydration apparatus of FIG. 1.

In prior art BTEX separation system 50 (FIG. 2), regenerator 36 gives off water/BTEX vapor at 38. Regenerator column 37 may include heat exchanger 39 (not shown in FIG. 1), having an entrance 41 and exit 43, for preheating the liquid glycol/water mixture after exiting absorber 12, and before expansion in flash tank 22. The water/BTEX vapor is then, typically, passed through a steam stripper 44, as is known in the prior art, and then through a condenser 46, which, as in the illustrated embodiment, may comprise an air cooled stage 48 and a water cooled stage 49.

The condensates are conducted to a three-phase separator 52, in which the condensates divide into a lowermost layer of water, a center layer of liquid BTEX, and an upper layer of gaseous BTEX. The liquid water may be circulated through stripper 44, for further polishing, cooled at cooler 54, and pumped off for other use, at 56. The liquid BTEX and other organic materials are separated from the liquid water at 58 for collection and possible use, for example, as a liquid fuel material. The gaseous BTEX may then simply be vented, at 60, or drawn, such as by a jet pump 62 driven by the flash gas from flash tank 24, to be burned/combusted at burner 36' for regenerator 36 or in a flare 64.

Figure 3:
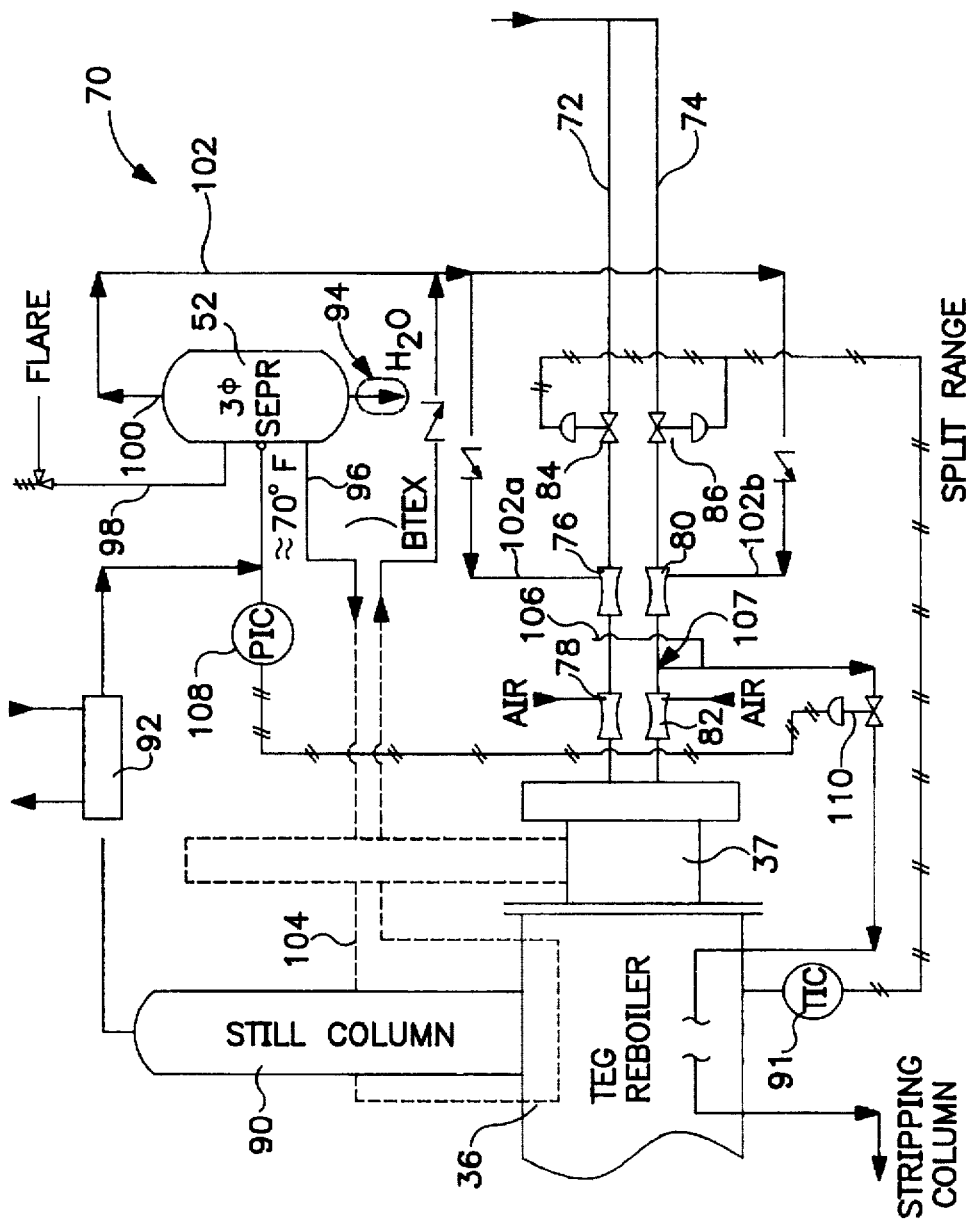
FIG. 3 is a schematic illustration of a portion of an improved glycol dehydration and BTEX separation apparatus according to the present invention.

Improved BTEX separation system 70 is provided and illustrated in FIG. 3. Regenerator 36 is, as in the prior art configuration, fired by burner 37. Unlike prior art burner configurations, burner 37, is supplied by two gas lines, 72 and 74, each of which may receive gas, typically, in a pressure range of approximately 65 psi to 136 psi. In line 72 are arranged in succession ejector 76, and ejector 78. In line 74 are arranged in succession ejector 80 and ejector 82. The discharge side of ejectors 78, 82 is preferably at a pressure of 25 psia—although other pressures are also contemplated.

Ejectors 76, 80 receive the fuel gas at pressure, and, on their vacuum sides, draw gaseous BTEX from the separator 52, in a manner to be described in further detail hereinafter. Ejectors 78, 82 draws combustion air, for example from ambient, into their vacuum sides. Ejectors 76, 80, and, in turn, ejectors 78, 82, respectively, then expand and eject the mixed gases at their respective exits, until the mixed fuel gases and air reach the burner 37.

Two control valves 84 and 86 are arranged upstream of ejectors 76, 80, in lines 72, 74 respectively. Both control valves 84 and 86 are connected to a temperature control 91, such as is known in the art, which is connected to regenerator 36. Plural gas lines are employed, so as to provide enhanced temperature control for the regenerator, in the form of an improved turn-down ratio for burner 37. To provide operation with improved stability and turndown, the temperature control valves 84, 86, employ split range control. Although in the present embodiment, two parallel gas lines with ejectors are employed, in other embodiments, three or more lines may be employed, and still be considered within the scope of the invention.

In order to control the amount of draw put on lines 102a, 102b, by ejectors 76, 80, a portion of the output from ejectors 76, 80 is diverted from the flow path to the burner, at 106, 107, and is passed through and heated in regenerator 36. The heated gas may then be used as stripping gas in a BTEX stripper (not shown) for preliminarily stripping and separating BTEX from water and steam/vapor at a location in the BTEX flow path upstream of separator 52, in a manner known in the art. The stripped BTEX gas and diverted fuel gas may then be directed to separator 52, and then, in turn, to line 102. A pressure control sensor 108, connected to separator 52, regulates the operation of control valve 110, to control the flow of gas diverted from ejectors 76, 80.

When the water/BTEX are desorbed from the glycol in regenerator 36, they pass through still column 90 and condenser/heat exchanger 92 (which may be suitably cooled by water or air, as may be known in the art), to three-phase separator 52. As previously mentioned, the three-phase separator 52 generally separates the water/BTEX into a liquid water portion, exiting at bottom outlet 94, a liquid BTEX portion, exiting at outlet 96, and a gaseous BTEX portion, which may either be burned off at a flare 98, or exited at outlet 100, along line 102 (which splits into lines 102a and 102b), to the vacuum inlet sides of ejectors 76 and 80, where the gaseous BTEX mixes with the fuel gas, and is reduced through combustion to environmentally more acceptable combustion byproducts.

As previously mentioned, in certain circumstances it may be impracticable or simply not cost effective to collect, store, transport or attempt to commercially exploit, offsite, the liquid BTEX which is produced by three-phase separator 52. The liquid BTEX may not simply be "dumped", though.

Accordingly, in the present invention, the liquid BTEX which is released from outlet 96, is passed in a heat exchange relationship 104 through the regenerator 36, preferably in a conduit which is submerged in, but in fluid isolation from, the heated glycol. The liquid BTEX is thus heated to vapor and returned from regenerator 36 to be joined with the already gaseous BTEX in line 102, to be burned in burner 37.

Since it is not desired to recycle directly the water from outlet 94 recovered from the gas, the water need merely be made fit for general overboard disposal. To that end, the water, coming from 94, will be passed through a system of filters prior to dumping. For example, the system (not shown) may be a two-bed system, a first bed employing surface treated clay and a second bed having activated charcoal. A suitable activated clay absorber material is Technical Materials TM-100 (™), which is part clay or active absorber and anthracite filter media. The clay or TW-100 bed serves to remove heavy oil and grease, while the activated carbon bed is used to remove BTEX from the water to levels such that the water can be simply sent to drain or dumped overboard. The spent adsorbent from the filter beds is then returned to the vendors for regeneration and recycling or disposal.

The various sensors, control valves and the like employed hereinabove may all be governed by a suitable programmable controller apparatus (not shown), such as are already known in the art.

The system of the present invention represents an improved method of removing BTEX and other organic constituents from the water recovered from natural gas in a glycol-based gas drying system, in which the BTEX is advantageously used as fuel for the glycol regenerator, and wherein the water is adequately treated prior to discarding of same, utilizing a simplified and compact set-up.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

I claim:

1. A method for separating water, recovered during the dehydration of a gas, from a dehydrating solution, the method comprising the steps of:

a) distilling the water from the dehydrating solution with distilling apparatus;

b) condensing the water from the distilling apparatus;

c) performing an initial separation of organic constituents which also may have been drawn from the dehydrating solution, from the water, into at least a liquid phase and a gaseous phase;

d) converting substantially all of the organic constituents which have been separated into a gaseous phase;

e) combusting the gaseous organic constituents in the distilling apparatus;

wherein the step of distilling the water includes the step of heating the water with a gas-fired burner apparatus being fueled by a gas from a pressurized source, and the step of combusting the organic constituents further comprises the step of mixing the organic constituents with the gas from the pressurized source fuel source.

f) transporting the fuel from the fuel source to the burner apparatus via two or more conduit apparatus operably disposed in parallel relation to one another;

g) monitoring the temperature of the distilling apparatus; and h) varying the flow of fuel from the fuel source to the burner apparatus as a function of the temperature of the distilling apparatus which is being monitored.

2. The method according to claim 1, further comprising the step of filtering the water with filter apparatus, so as to remove at least a portion of any organic constituents remaining in said water, toward enabling said water to be released to ambient surroundings.

3. The method according to claim 1, wherein the step of converting all of the organic constituents into a gaseous phase further comprises the step of conducting the liquid phase of the organic constituents through the distilling apparatus and evaporating the liquid phase of the organic constituents.

4. The method according to claim 1, further comprising the step of:

expanding the fuel as it is being transported from the pressurized fuel source to the burner apparatus.

* * * * *